United States Patent Office 3,231,594
Patented Jan. 25, 1966

3,231,594
ADDITION OF SILICON HYDRIDES TO
β-ALKENYL HALIDES
John L. Speier, Midland, Mich., assignor to Dow Corning Corporation, Midland, Mich., a corporation of Michigan
No Drawing. Filed May 10, 1961, Ser. No. 109,012
3 Claims. (Cl. 260—448.2)

This invention relates to a new method of preparing silanes and siloxanes, which contain either higher n-alkyl or higher iso-alkyl groups by reacting β-alkenyl chlorides and bromides with silicon hydrides in the presence of a catalyst.

It has been known for some time that silicon hydrides could be added to alkenes. It has also been known for some time that when a β-alkene was used, a mixture of sec-alkyl and n-alkyl substituents are obtained. For example, when 2-butene is used, sec-butyl and n-butyl substituents are obtained. It is thought that the n-alkyl substituents result from double-bond migration and allyl rearrangements. Based on this knowledge, it would be expected that when β-alkenyl chlorides or bromides are used, both chloro-n-alkyl and chloro-sec-alkyl substituents would be obtained. However, it has been discovered quite unexpectedly that when β-alkenyl chlorides or bromides, which have a chlorine or bromine atom on the terminal carbon atom beta to the double bond, are reacted with silicon hydrides, the beta halogen atom is eliminated and an alkyl-substituent is obtained which is bonded to the silicon atom through the terminal carbon atom. It is believed that this unexpected result occurs because of double-bond migration, allyl rearrangements and elimination of a chlorine or bromine atom from the allylic chloride or bromide. However, this invention is not restricted to this explanation.

It is an object of the present invention to prepare silanes and siloxanes with either alkyl, chloroalkyl or bromoalkyl substituents which are bonded to the silicon atom through a terminal carbon atom. It is also an object to prepare these compounds from alkenyl chlorides and bromides which have the double-bond in a beta position. These alkenyl chlorides and bromides are preferable to alkenes with terminal double-bonds because of their commercial availability. It is also the object of this invention to provide a feasible method of preparing omega-haloalkyl-substituted silanes and siloxanes.

These objects are achieved by a method of preparing $$R_nSi(CH_2CH-CHR''')_m \atop {R' \ R''}^{Y'_{4-m-n}}$$

by reacting (1) $R_nSiH_m(Y)_{4-m-n}$ with (2)   $XCH_2C=CR''' \atop {R' \ R''}$ in the presence of (3) a catalyst selected from the group consisting of platinum, palladium, rhodium and ruthenium catalysts at a temperature in excess of room temperature, wherein R is selected from the group consisting of alkyl, phenyl, halogenated alkyl and halogenated phenyl radicals, n has a value of from 0 to 3 inclusive, m has a value of from 0 to 3 inclusive, Y is selected from the group consisting of halogen atoms and alkoxy, phenoxy and siloxy radicals, said siloxy radical containing at least 1 silicon atom and at least 1 oxygen atom, with the remaining unsatisfied valences of the siloxy radical being satisfied by substituents selected from the group consisting of monovalent hydrocarbon radicals and hydrogen atoms, said hydrocarbon radicals being essentially free of aliphatic unsaturation, there being at least one silicon-bonded hydrogen atom in (1), Y' being identical to Y, except that when Y is a siloxy radical containing one or more silicon-bonded hydrogen atoms, at least one of these hydrogen atoms is replaced in Y' by a $$-CH_2CH-CHR''' \atop {R' \ R''}$$

group, R' and R'' being selected from the group consisting of hydrogen atoms and alkyl radicals of less than 5 carbon atoms, X being selected from the group consisting of chlorine and bromine atoms, R''' being a monovalent radical selected from the group consisting of alkyl, chloro-alkyl, and bromo-alkyl radicals.

The term "platinum, palladium, rhodium and ruthenium catalysts" include these catalysts in the form of finely divided metal, on a carrier, or in the form of a compound. Examples of the various catalysts and forms are listed in Example 1. Platinum catalysts are preferred. The term platinum catalyst includes finely divided platinum, platinum compounds, platinum on a carrier and any other form the platinum catalyst can take. Chloroplatinic acid is the preferred platinum catalyst. The amounts of catalyst used are not critical. However, there is no particular advantage in using a large amount of catalyst. The preferred amounts of platinum vary from .000001 to .0001 mole of Pt per mole of β-alkenyl halide.

The temperature of the reaction is not especially critical. However, it is necessary to carry out the reaction at a temperature which is at least slightly above room temperature. There is no particular advantage in using very high temperatures. The preferred temperature range of the reaction is from 40° to 150° C.

The reactant silanes that can be used are of the general formula $R_nSiH_m(Y)_{4-(m+n)}$. R can be an alkyl radical such as methyl, ethyl, pentyl, decyl, octadecyl, hexacosyl, etc. R can also be a halogenated alkyl radical such as $ClCH_2$, $BrC_2H_4$, $FC_2H_4$, $CF_3CH_2CH_2$, $IC_2H_4$ and $ClC_8H_{16}$. R can also be a phenyl or halogenated phenyl such as p-$ClC_6H_4$, m-$BrC_6H_4$, o-$FC_6H_4$ and p-$IC_6H_4$. The subscript n has a value of from 0 to 3. Thus, for example, the silane can be $(CH_3)_2ClSiH$, $(C_2H_5)_3SiH$, $(C_6H_5)HSiCl_2$, $HSiCl_3$, $H_2SiCl_2$, $H_3SiCl$ and

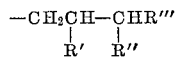

Each of the R groups on the silane can be different. For example, the silane can be $(CH_3)(C_6H_5)ClSiH$. The subscript m has a value of from 0 to 3. However, there must be at least one silicon-bonded hydrogen in the silane. Hence the silane can be $(CH_3)_2ClSiH$, $(C_2H_5)ClSiH_2$, $(C_6H_5)SiH_3$ and

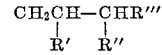

Each of the hydrogen atoms in $R_nSiH_m(Y)_{4-m-n}$ is replaced by the $$CH_2CH-CHR''' \atop {R' \ R''}$$

group.

Y can be any halogen atom. Thus the silane can be $(CH_3)HSiBr_2$, $(C_4H_9)_2HSiF$ and $(C_2H_5)_2HSiI$, for example. Y can also be an alkoxy group. For example, Y can be $OCH_3$, $OC_3H_7$, $OC_5H_{11}$ and $OC_{10}H_{21}$. Y can also be a phenoxy group. Y can also be a siloxy radical with at least one silicon and one oxygen atom. The remaining unsatisfied valences of the siloxy radical are satisfied by substituents selected from the group consisting of monovalent hydrocarbon radicals and hydrogen atoms. The hydrocarbon radicals in the siloxy groups must be relatively free of aliphatic unsaturation in order to limit the SiH addition to the β-alkenyl halides. Y can contain just one silicon atom, such as OSi(CH₃)₃ or can be a siloxane group such as

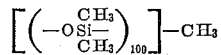

The hydrocarbon groups attached to the silicon atoms in the siloxy group can be all the same or mixed. For example, Y can be

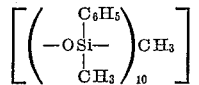

One or more hydrogen atoms can be attached to the silicon atom in the siloxy group. For example, Y can be

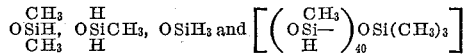

There can be from 0 to 4 Y groups on $R_nSiH_m(Y)_{4-m-n}$. However, there must be at least one silicon-bonded hydrogen atom in the silicon hydride. Thus there can be no more than 3 substituents selected from the group consisting of halogen atoms and alkoxy and phenoxy radicals. In this case the other valence of the silicon atom can be satisfied by either a hydrogen atom or a siloxy group which contains at least one silicon-bonded hydrogen atom. There can be 4 siloxy groups as long as there is at least one silicon-bonded hydrogen present. Hence the silane can be (CH₃)₂SiH₂, (C₂H₅)₂HSiF, (C₆H₅)HSiCl₂, (C₃H₇)₂HSi(OC₂H₅), (CH₃)HSi(OCH₃)₂, HSi(OCH₃)₃, HSi(Cl)₃,

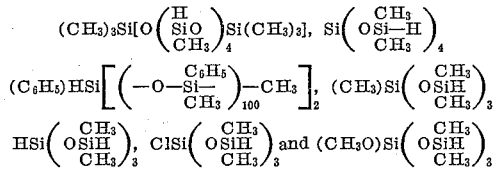

Y' is identical to Y, except that when Y is a siloxy radical containing one or more silicon-bonded hydrogen atoms, at least one of these hydrogen atoms is replaced in Y' by a

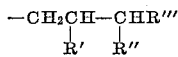

group. The last 10 silicon hydrides in the table in Example 3 contain silicon-bonded hydrogen atoms in the Y group. These hydrogen atoms are replaced by

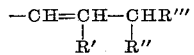

groups, as shown in the reaction products obtained. Obviously not all of these hydrogen atoms are replaced when an insufficient amount of β-alkenyl halide is used.

The double bond in the alkenyl halide,

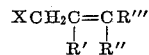

must be located between the beta and gamma carbon atoms. A chlorine or bromine atom must be bonded to the terminal carbon atom which is in the beta position to the double bond. X can be either a chlorine or bromine atom.

R' and R" are selected from the group consisting of hydrogen atoms and alkyl radicals of less than 5 carbon atoms. Thus the alkenyl halide can be ClCH₂CH=CHCH₂Cl, ClCH₂CH=C(CH₃)CH₂Cl
BrCH₂CH=C(CH₂CH₃)CH₂Br
BrCH₂CH=C[(CH₂)₃CH₃]CH₃
ClCH₂C(CH₃)=CHCH₃, ClCH₂C(CH₂CH₃)=CHCH₂Cl
ClCH₂C[(CH₂)₃CH₃]=CHCH₂Cl and ClCH₂C[(CH₂)₂CH₃]=C[(CH₂)₂CH₃]CH₂Cl R'" is a monovalent radical selected from the group consisting of alkyl, chloro-alkyl and bromo-alkyl radicals. Thus R'" can be CH₃, CH₂Cl, CH₂CH₃, CH₂CH₂Cl, CH₂CH₂Br, (CH₂)₄CH₃, (CH₂)₄CH₂Cl
CH₂CH(Cl)(CH₃)₂, (CH₂)₈CH₃, (CH₂)₈CH₂Br

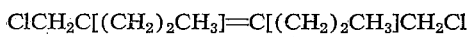

(CH₂)₁₂CH₃, (CH₂)₁₂CH₂Cl, (CH₂)₆CH(Cl)(CH₂)₃CH₃
(CH₂)₁₅CH₃, —(CH₂)₁₅CH₂Br and

—(CH₂)₁₀CH(Cl)(CH₂)₄CH₃

R'" can also be a branched structure. For example, R'" can be —CH₂CH(Cl)C(CH₃)₃,

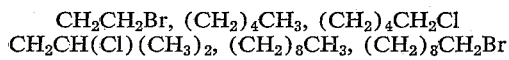
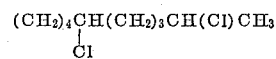

and

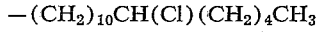

The method of this invention is useful for producing silanes and siloxanes with either alkyl, chloro-alkyl or bromo-alkyl substituents which are bonded to the silicon atom through terminal carbon atoms. These substituents are obtained by reacting silicon hydrides with β-alkenyl chlorides and bromides. These alkenyl halides are more commercially available than α-alkenes. The method of this invention is a novel and efficient method of preparing silanes and siloxanes containing higher alkyl groups.

The compounds produced by the method of this invention are especially useful as intermediates in the production of organo-functional silicon compounds.

The functionality of the Y group on the silicon and the chlorine or bromine which can be present in the CH₂CH₂CH₂R" group makes this compound especially valuable as an intermediate in the production of organosiloxanes for use as lubricants.

The following examples are exemplary of the method of this invention and should not be construed as limiting the invention which is properly delineated in the appended claims.

*Example 1*

$5 \times 10^{-5}$ mol of H₂PtCl₆ in isopropyl alcohol were added to 5 mols of 1,4-dichlorobutene-2. The mixture was heated to 50° C. at which time 11.5 mols of (CH₃)₂ClSiH were added. The temperature then rose to 130° C. The product was distilled at 75 to 77 mm. and 610.8 g. of (CH₃)₂Si(CH₂)₄Cl were obtained.
                                        |
                                        Cl The compound had the following physical properties: $n_D^{25}$=1.4503 to 1.4506; M.W.=185.5; B.P.=124° C. at 77 mm.; 100 to 101.5° C. at 30 mm.; $R_D$ (cal'd)=.2619, $R_D$ (obs.)=.2616; N.E. (calc'd)=185.5, N.E.

(obs.)=185.9

$d_n^{25}$=1.0296 g./ml.; $MR_D$=48.53. The structure was confirmed by infrared spectroscopy.

Equivalent results are obtained when the following amounts of H₂PtCl₆ are used in place of the amount used above: $5 \times 10^{-6}$, $5 \times 10^{-4}$, $5 \times 10^{-3}$ and $5 \times 10^{-2}$ mol of H₂PtCl₆ per 5 mols of 1,4-dichlorobutene-2.

Equivalent results are obtained when one of the following catalysts is used in place of chloroplatinic acid at the same ratio of platinum to 1,4-dichlorobutene-2; platinum-on-charcoal, platinum-on-SiO₂, platinum-on-Al₂O₃, ruthenium-on-Al₂O₃, rhodium-on-Al₂O₃, palladium-on-SiO₂, H₂[PdCl₆], H₃[RhCl₆] and RuCl₃.

Example 2

1310 cc. (12.7 mols) of methyldichlorosilane and 0.35 ml. of .2 M chloroplatinic acid were mixed in a stainless steel pressure vessel. 876 g. (7 mols) of 1,4-dichlorobutene-2 were pumped into the vessel and the temperature maintained at 100° C. for several hours. The products were then distilled. 697 g. of 4-chlorobutylmethyldichlorosilanes were obtained.

Example 3

When the following β-alkenyl chlorides and bromides are reacted with the following silicon hydrides in the presence of $1 \times 10^{-5}$ mols of chloroplatinic acid per mol of alkenyl halide at a temperature of 130° C., there being about 2 mol of SiH per mol of β-alkenyl halide, the following products are obtained:

TABLE

| β-Alkenyl Halide | Silicon Hydride | Product |
|---|---|---|
| $ClCH_2CH=CHCH_3$<br>$ClCH_2CH=CHCH_3$<br>$ClCH_2CH=CH(CH_2)_5Cl$ | $HSiCl_3$<br>$HSi(OCH_3)_3$<br>$H_3SiCl$ | $CH_3CH_2CH_2CH_2SiCl_3$<br>$[CH_3(CH_2)_3]Si(OCH_3)_3$<br>$[Cl(CH_2)_8]_3SiCl$ |
| $ClCH_2CH=CHCH_3$ | $HSi\left(OSiH\begin{smallmatrix}CH_3\\CH_3\end{smallmatrix}\right)_3$ | $[Cl(CH_2)_4]Si[OSi(\begin{smallmatrix}CH_3\\CH_3\end{smallmatrix})(CH_2)_4Cl]_3$ |
| $ClCH_2CH=CH(CH_2)_{21}Cl$<br>$ClCH_2CH=CH(CH_2)_8Cl$<br>$BrCH_2CH=CHCH_2CH_3$<br>$ClCH_2CH=CH(CH_2)_4CH_3$<br>$ClCH_2CH=CH(CH_2)_7CH_3$<br>$ClCH_2CH=CH(CH_2)_{27}Cl$<br>$BrCH_2CH=CHCH_2Br$ | $(CH_3)HSiF_2$<br>$(CH_3)HSiI_2$<br>$(CH_3)HSi(OCH_3)_2$<br>$(C_6H_5)_2HSi(OC_3H_7)$<br>$(CH_3)H_2Si(OC_{10}H_{21})$<br>$(C_6H_5)_2HSi(OC_6H_5)$<br>$(CH_3)HSi[OSi(CH_3)_3]_2$ | $(CH_3)[Cl(CH_2)_{24}]SiF_2$<br>$(CH_3)[Cl(CH_2)_{11}]SiI_2$<br>$(CH_3)[CH_3(CH_2)_4]Si(OCH_3)_2$<br>$(C_6H_5)_2[CH_3(CH_2)_7]Si(OC_3H_7)$<br>$(CH_3)[CH_3(CH_2)_{10}]_2Si(OC_{10}H_{21})$<br>$(C_6H_5)_2[Cl(CH_2)_{30}]Si(OC_6H_5)$<br>$(CH_3)[Br(CH_2)_4]Si[OSi(CH_3)_3]_2$ |
| $ClCH_2CH=CH(CH_2)_{20}CH_3$ | $(C_3H_7)_2SiH\left[\left(-O\underset{CH_3}{\overset{CH_3}{\underset{|}{Si}}}-\right)_{10}-CH_3\right]$ | $(C_3H_7)_2[CH_3(CH_2)_{23}]Si\left[\left(-O\underset{CH_3}{\overset{CH_3}{\underset{|}{Si}}}-\right)_{10}-CH_3\right]$ |
| $BrCH_2CH=CH(CH_2)_8Br$ | $(CH_3)_2SiH\left[\left(-O-\underset{CH_3}{\overset{CH_3}{\underset{|}{Si}}}-\right)_{100}-CH_3\right]$ | $(CH_3)_2[Br(CH_2)_{11}]Si\left[\left(-O-\underset{CH_3}{\overset{CH_3}{\underset{|}{Si}}}-\right)_{100}-CH_3\right]$ |
| $BrCH_2CH=CH(CH_2)_{11}CH_3$ | $(C_2H_5)_2SiH\left[\left(-O-\underset{C_6H_5}{\overset{C_6H_5}{\underset{|}{Si}}}-\right)_{10}-CH_3\right]$ | $(C_2H_5)_2[CH_3(CH_2)_{14}]Si\left[\left(-O-\underset{C_6H_5}{\overset{C_6H_5}{\underset{|}{Si}}}-\right)_{10}-CH_3\right]$ |
| $BrCH_2CH=CH(CH_2)_{21}Br$ | $(C_6H_5)SiH\left[\left(-O-\underset{CH_3}{\overset{C_6H_5}{\underset{|}{Si}}}-\right)_{100}-CH_3\right]_2$ | $(C_6H_5)[Br(CH_2)_{24}]Si\left[\left(-O-\underset{CH_3}{\overset{C_6H_5}{\underset{|}{Si}}}-\right)_{100}-CH_3\right]_2$ |
| $ClCH_2CH=CHC(CH_3)_3$<br>$ClCH_2CH=CHCH_2C(CH_3)_2CH_2Cl$<br>$ClCH_2CH=CH(CH_2)_4CH(CH_3)(CH_2)_2$-<br>$CH_2Cl$<br>$BrCH_2CH=CHCH_2C(CH_3)_2CH_2Br$<br>$ClCH_2CH=CH(CH_2)_6C(CH_3)_2CH(CH_2Cl)$-<br>$C(CH_3)_3$<br>$ClCH_2CH=C(CH_3)CH_2Cl$<br>$BrCH_2CH=C[(CH_2)_3CH_3]CH_3$<br>$ClCH_2C(CH_2CH_3)=CHCH_2Cl$<br>$ClCH_2C[(CH_2)_2CH_3]=C[(CH_2)_2CH_3]CH_2Cl$ | $(C_{10}H_{20})HSiBr_2$<br>$(C_{20}H_{41})HSiCl_2$<br>$(C_6H_5)(C_2H_5)ISiH$<br>$(ClC_2H_4)(CH_3)FSiH$<br>$(p\text{-}ClC_6H_4)(C_3H_7)_2SiH$<br>$(BrC_2H_4)(CH_3)BrSiH$<br>$(CF_3CH_2CH_2)SiH_3$<br>$(IC_2H_4)(CH_3)ClSiH$<br>$(p\text{-}BrC_6H_4)(C_2H_5)HSiCl$ | $(C_{10}H_{21})[(CH_3)_3C(CH_2)_3]SiBr_2$<br>$(C_{20}H_{41})[ClCH_2C(CH_3)_2(CH_2)_4]SiCl_2$<br>$[ClCH_2C(CH_3)_2CH(CH_3)(CH_2)_7](C_6H_5)(C_2H_5)SiI$<br>$(ClC_2H_4)(CH_3)[BrCH_2C(CH_3)_2(CH_2)_4]SiF$<br>$(p\text{-}ClC_6H_4)(C_3H_7)_2[(CH_3)_3CCH(CH_2Cl)C(CH_3)_2$-<br>$(CH_2)_9]Si$<br>$(BrC_2H_4)(CH_3)[ClCH_2CH(CH_3)(CH_2)_2]SiBr$<br>$[CH_3(CH_3CH_2CH_2CH_2)CH(CH_2)_2]_3Si(CF_3CH_2CH_2)$<br>$(IC_2H_4)(CH_3)[ClCH_2CH(CH_2CH_3)(CH_2)_2]SiCl$<br>$(p\text{-}BrC_6H_4)(C_2H_5)[ClCH_2CH(CH_2CH_3)CH$-<br>$(CH_2CH_2CH_3)CH_2]SiCl$ |
| $ClCH_2C[(CH_2)_3CH_3]=C(CH_3)CH_2CH_3$ | $(O\text{-}FC_6H_4)(CH_3)HSiCl$ | $(O\text{-}FC_6H_4)(CH_3)[CH_3CH_2CH(CH_3)CH(CH_2CH_2$-<br>$CH_2CH_3)CH_2]SiCl$ |
| $ClCH_2CH=CHCH_3$ | $ClSi\left(OSiH\begin{smallmatrix}CH_3\\CH_3\end{smallmatrix}\right)_3$ | $ClSi[OSi(\begin{smallmatrix}CH_3\\CH_3\end{smallmatrix})(CH_2)_4CH_3]_3$ |
| $ClCH_2CH=CHCH_2Cl$ | $(CH_3O)Si\left(OSiH\begin{smallmatrix}CH_3\\CH_3\end{smallmatrix}\right)_3$ | $(CH_3O)Si[OSi(\begin{smallmatrix}CH_3\\CH_3\end{smallmatrix})(CH_2)_4Cl]_3$ |
| $ClCH_2CH=CHCH_2Cl$ | $(CH_3)_2SiH\left(OSiH\begin{smallmatrix}CH_3\\CH_3\end{smallmatrix}\right)$ | $(CH_3)_2Si[(CH_2)_4Cl][OSi(\begin{smallmatrix}CH_3\\CH_3\end{smallmatrix})(CH_2)_4Cl]$ |
| $ClCH_2CH=CHCH_2CH_3$ | $(C_6H_5)(CH_3)SiH(-O\underset{H}{\overset{H}{\underset{|}{Si}}}CH_3)$ | $(C_6H_5)(CH_3)Si[(CH_2)_4CH_3]\{OSi[(CH_2)_4CH_3]_2\}$ |
| $ClCH_2CH=CHCH_2Cl$ | $(CH_3)_2SiH\left[\left(O\underset{H}{\overset{CH_3}{\underset{|}{Si}}}-\right)_{40}OSi(CH_3)_3\right]$ | $(CH_3)_2Si[(CH_2)_4Cl]\left\{\left[O\underset{(CH_2)_4Cl}{\overset{CH_3}{\underset{|}{Si}}}-\right]_{40}-O-Si(CH_3)_3\right\}$ |
| $ClCH_2CH=CHCH_2Cl$ | $(CH_3)_2SiH\left[O\underset{|}{\overset{CH_3}{Si}}O\left(\underset{H}{\overset{CH_3}{\underset{|}{Si}}}O\right)\right]_3$ | $(CH_3)_2Si[(CH_2)_4Cl]\left\{O\underset{|}{\overset{CH_3}{Si}}O\left[\underset{(CH_2)_4Cl}{\overset{CH_3}{\underset{|}{Si}}}O\right]\right\}_3$ |
| $ClCH_2CH=CHCH_2Cl$ | $(CH_3)_2SiH(OSiH_3)$ | $(CH_3)_2Si[(CH_2)_4Cl]\{OSi[(CH_2)_4Cl]_3\}$ |
| $ClCH_2CH=CHCH_2Cl$ | $(CH_3)_3Si\left[O\left(\underset{CH_3}{\overset{H}{\underset{|}{Si}}}O\right)_4Si(CH_3)_3\right]$ | $(CH_3)_3Si\left\{O\left[\underset{(CH_2)_4Cl}{\overset{CH_3}{\underset{|}{Si}}}\right]_4Si(CH_3)_3\right\}$ |

TABLE—Continued

| β-Alkenyl Halide | Silicon Hydride | Product |
|---|---|---|
| ClCH$_2$CH=CHCH$_2$Cl | Si$\left(\text{OSi-H} \atop \text{CH}_3 \atop \text{CH}_3\right)_4$ | Si$\left[\text{OSi(CH}_2)_4\text{Cl} \atop \text{CH}_3 \atop \text{CH}_3\right]_4$ |
| ClCH$_2$CH=CHCH$_2$Cl | (CH$_3$)Si$\left(\text{OSiH} \atop \text{CH}_3 \atop \text{CH}_3\right)_3$ | (CH$_3$)Si$\left[-\text{OSi(CH}_2)_4\text{Cl} \atop \text{CH}_3 \atop \text{CH}_3\right]_3$ |

Equivalent results are obtained when any of the other catalysts of Example 1 are substituted for the chloroplatinic acid at the same mol ratio of metal to β-alkenyl halide.

That which is claimed is:

1. A method of preparing $$\text{R}_n\overset{\text{Cl}_{3-n}}{\underset{|}{\text{Si}}}(\text{CH}_2\text{CH}_2\text{CH}_2\text{R}''')$$

by reacting (1) R$_n$SiH(Cl)$_{3-n}$ with (2)

$$\text{ClCH}_2\text{CH}=\text{CHR}'''$$

in the presence of (3) a platinum catalyst, there being at least .000001 mole of platinum per mole of (2), at a temperature in excess of room temperature wherein R is an alkyl radical of less than 10 carbon atoms, $n$ has a value of from 0 to 3 inclusive, and R''' is a chloroalkyl radical of less than 8 carbon atoms.

2. A method of preparing $$(\text{CH}_3)_n\overset{\text{Cl}_{3-n}}{\underset{|}{\text{Si}}}[(\text{CH}_2)_{m+3}\text{Cl}]$$

by reacting (1) (CH$_3$)$_n$SiH(Cl)$_{3-n}$ with (2)

$$\text{ClCH}_2\text{CH}=\text{CH}(\text{CH}_2)_m\text{Cl}$$

in the presence of (3) a platinum catalyst, there being at least .000001 mole of platinum per mole of (2), at a temperature in excess of room temperature, wherein $n$ has a value of from 0 to 3 inclusive, $m$ has a value of from 1 to 7 inclusive.

3. A method of preparing $$(\text{CH}_3)_n\overset{\text{Cl}_{3-n}}{\underset{|}{\text{Si}}}[(\text{CH}_2)_4\text{Cl}]$$

by reacting (1) (CH$_3$)$_n$SiH(Cl)$_{3-n}$ with (2)

$$\text{ClCH}_2\text{CH}=\text{CHCH}_2\text{Cl}$$

in the presence of (3) at least .000001 mole of H$_2$PtCl$_6$ per mole of (2) at a temperature in excess of room temperature, wherein $n$ has a value of from 1 to 2 inclusive.

References Cited by the Examiner

UNITED STATES PATENTS

| 2,637,738 | 5/1953 | Wagner | 260—448.2 |
| 2,823,218 | 2/1958 | Speier et al. | 260—448.2 |
| 2,851,473 | 9/1958 | Wagner et al. | 260—448.2 |

OTHER REFERENCES

Petrov et al., "Doklady Akad. Nauk. SSSR," vol. 112 (1957), pp. 273–5 (51 Chem. Abstr. 11,987).

TOBIAS E. LEVOW, *Primary Examiner.*

ALPHONSO D. SULLIVAN, *Examiner.*